US012802520B2

(12) United States Patent
Seckel et al.

(10) Patent No.: US 12,802,520 B2
(45) Date of Patent: Nov. 17, 2026

(54) GAMING MACHINES WITH MOVEABLE TOPPER AND METHOD OF OPERATING THE SAME

(71) Applicant: Aristocrat Technologies Australia Pty Limited, North Ryde (AU)

(72) Inventors: Timothy Seckel, Streamwood, IL (US); Joseph Kaminkow, Las Vegas, NV (US)

(73) Assignee: Aristocrat Technologies Australia Pty Limited, North Ryde (AU)

(*) Notice: Subject to any disclaimer, the term of this patent is extended or adjusted under 35 U.S.C. 154(b) by 185 days.

(21) Appl. No.: 18/828,693

(22) Filed: Sep. 9, 2024

(65) Prior Publication Data

US 2024/0428643 A1 Dec. 26, 2024

Related U.S. Application Data

(63) Continuation of application No. 17/824,646, filed on May 25, 2022, now Pat. No. 12,112,595, which is a continuation of application No. 17/166,311, filed on Feb. 3, 2021, now Pat. No. 11,361,614, which is a continuation of application No. 16/446,074, filed on Jun. 19, 2019, now Pat. No. 10,937,270.

(60) Provisional application No. 62/725,644, filed on Aug. 31, 2018.

(51) Int. Cl.
*G07F 17/32* (2006.01)

(52) U.S. Cl.
CPC ...... *G07F 17/3216* (2013.01); *G07F 17/3211* (2013.01); *G07F 17/3267* (2013.01)

(58) Field of Classification Search
CPC ............. G07F 17/3216; G07F 17/3211; G07F 17/3267; G07F 17/3218
USPC ........................................................... 463/31
See application file for complete search history.

(56) References Cited

U.S. PATENT DOCUMENTS

| | | |
|---|---|---|
| D221,968 S | 9/1971 | Fieldhouse |
| D334,667 S | 4/1993 | Lonczak |
| D486,962 S | 2/2004 | Snell |
| D492,493 S | 7/2004 | Dretzka |
| D496,407 S | 9/2004 | Gadda |
| D505,555 S | 5/2005 | Snell |
| D508,961 S | 8/2005 | Gatto |
| D509,369 S | 9/2005 | Snell |
| 7,090,378 B1 | 8/2006 | Zadro |
| D539,854 S | 4/2007 | Luciano |
| D547,555 S | 7/2007 | Lo |
| D549,968 S | 9/2007 | Pitot |

(Continued)

OTHER PUBLICATIONS

Australian Examination Report No. 2 issued in App. No. AU2019222915 dated Jun. 19, 2025 (pp. 1-4).

(Continued)

*Primary Examiner* — Pierre E Elisca
(74) *Attorney, Agent, or Firm* — Armstrong Teasdale LLP

(57) ABSTRACT

An electronic gaming machine includes a display screen for displaying an electronic game, a mobile topper unit configured to be positioned in a first position and a second position, the first position being a lower position that the second position, and a controller programmed to execute the electronic game and programmed to provide instructions to change the position of the mobile topper unit between the first position and the second position based on an event of the wagering game.

20 Claims, 9 Drawing Sheets

(56) References Cited

U.S. PATENT DOCUMENTS

D569,919 S 5/2008 Zielinski
D580,184 S 11/2008 Svendsen
D590,025 S 4/2009 Fiore
D599,858 S 9/2009 Lesley
D599,860 S 9/2009 Lesley
D604,368 S 11/2009 Lesley
D615,598 S 5/2010 Mccomb
D619,177 S 7/2010 Lee
D622,323 S 8/2010 De Viveiros Ortiz
D622,780 S 8/2010 Lesley
D622,781 S 8/2010 Lesley
D624,604 S 9/2010 Wudtke
D633,644 S 3/2011 Sprengers
D637,652 S 5/2011 Tahara
D639,496 S 6/2011 Wada
D649,790 S 12/2011 Pitot
D654,308 S 2/2012 Tiemann
D657,575 S 4/2012 Weber
D665,033 S 8/2012 Desimone
D665,853 S 8/2012 Desimone
8,303,420 B2 11/2012 Chudek
D681,129 S 4/2013 Desimone
D697,558 S 1/2014 Myers
D701,050 S 3/2014 Yang
D703,628 S 4/2014 Griffith
D705,872 S 5/2014 Ortiz
D707,454 S 6/2014 Pitot
D711,874 S 8/2014 Cope
D712,963 S 9/2014 Fleet
D719,616 S 12/2014 Inoue
8,992,296 B2 * 3/2015 Weiss .................. G07F 17/3267 463/16
D727,431 S 4/2015 Themann
D727,630 S 4/2015 Zadro
D730,065 S 5/2015 Tsai
D730,993 S 6/2015 Castro
D736,001 S 8/2015 Yang
D737,060 S 8/2015 Yang
D737,580 S 9/2015 Tsai
D740,887 S 10/2015 Randazzo
D751,829 S 3/2016 Yang
D754,446 S 4/2016 Yang
D756,501 S 5/2016 Park
D776,316 S 1/2017 Kim
D779,836 S 2/2017 Bailey
D793,099 S 8/2017 Bailey
D801,059 S 10/2017 Gan
D803,323 S 11/2017 Bussey
D816,350 S 5/2018 Yang
D818,048 S 5/2018 Calhoun
D819,747 S 6/2018 Castro
D820,915 S 6/2018 Lee
D824,681 S 8/2018 Vaughn
D830,706 S 10/2018 Pitot
D832,599 S 11/2018 Zadro
D840,699 S 2/2019 Xie
D842,930 S 3/2019 Johnson
D844,885 S 4/2019 Tommei
D846,288 S 4/2019 Yang
D846,651 S 4/2019 Colvin
D847,906 S 5/2019 Colvin
D848,158 S 5/2019 Yang
D850,125 S 6/2019 Wang
D850,537 S 6/2019 Urban
D854,620 S 7/2019 Yeh
D858,641 S 9/2019 Legras
10,398,213 B2 9/2019 Vargas
D865,375 S 11/2019 Yang
D866,667 S 11/2019 Stair
D869,863 S 12/2019 Liu
D870,820 S 12/2019 Urban
D871,084 S 12/2019 Pestl
D871,507 S 12/2019 Urban
D872,190 S 1/2020 Zedell, Jr.
D873,574 S 1/2020 Wei
D874,161 S 2/2020 Yang
D874,162 S 2/2020 Greenwalt
D875,103 S 2/2020 Vogel
D875,838 S 2/2020 Urban
10,573,119 B2 2/2020 Lamb
D877,522 S 3/2020 Boehm
D880,605 S 4/2020 Bussey
D880,616 S 4/2020 Field
D882,843 S 4/2020 Kaiser
D883,329 S 5/2020 Shi
D884,700 S 5/2020 Shao
D885,387 S 5/2020 Hu
D886,206 S 6/2020 Colvin
D886,360 S 6/2020 Xu
D890,185 S 7/2020 Jetter
D890,752 S 7/2020 Huang
D891,519 S 7/2020 Chen
D892,935 S 8/2020 Ducay
D895,020 S 9/2020 Legras
D898,128 S 10/2020 Urban
D898,383 S 10/2020 Zhao
D898,387 S 10/2020 Yang
D900,938 S 11/2020 Lesourd
D901,908 S 11/2020 Zhao
D903,084 S 11/2020 Huang
D927,600 S 8/2021 Colvin
D927,601 S 8/2021 Colvin
D927,602 S 8/2021 Colvin
D928,237 S 8/2021 Colvin
D946,661 S 3/2022 Thompson
D954,150 S 6/2022 Seckel
11,495,082 B2 11/2022 Lamb
D988,414 S 6/2023 Colvin
D988,416 S 6/2023 Colvin
D1,013,045 S 1/2024 Voloh
2005/0020348 A1 1/2005 Thomas
2005/0277468 A1 12/2005 Fitzsimons
2007/0111776 A1 5/2007 Griswold
2008/0132313 A1 6/2008 Rasmussen
2008/0268944 A1 10/2008 Wudtke
2009/0162245 A1 6/2009 Rasmussen
2009/0176568 A1 7/2009 Reddy
2010/0210354 A1 8/2010 Burak
2011/0058269 A1 3/2011 Su
2012/0220363 A1 8/2012 Bytnar
2014/0268876 A1 9/2014 Lee
2015/0269808 A1 9/2015 Cornell
2016/0089607 A1 3/2016 Ike
2016/0256785 A1 9/2016 Sum
2018/0078854 A1 3/2018 Achmueller
2021/0035402 A1 * 2/2021 Rye ..................... G07F 17/3216
2021/0209893 A1 * 7/2021 Rye ..................... G07F 17/3241

OTHER PUBLICATIONS

Office Action dated Apr. 3, 2020, for U.S. Appl. No. 29/661,984 (pp. 1-9).
Office Action dated Aug. 11, 2020 for U.S. Appl. No. 16/446,074 (pp. 1-7).
Office Action dated Dec. 1, 2020 for U.S. Appl. No. 29/661,984 (pp. 1-14).
Notice of Allowance dated Nov. 19, 2020 for U.S. Appl. No. 16/466,074 (pp. 1-9).
Corrected Notice of Allowability dated Jan. 7, 2021 for U.S. Appl. No. 16/446,074 (pp. 1-5).
Corrected Notice of Allowability dated Jan. 25, 2021 for U.S. Appl. No. 16/446,074 (pp. 1-2).
Office Action (Non-Final Rejection) dated Feb. 22, 2022 for U.S. Appl. No. 17/166,311 (pp. 1-6).
Office Action (Notice of Allowance and Fees Due (PTOL-85)) dated Apr. 6, 2022 for U.S. Appl. No. 17/166,311 (pp. 1-8).
Office Action dated Aug. 12, 2021 for U.S. Appl. No. 29/661,984 (pp. 1-9).
Notice of Allowanace dated Feb. 3, 2022 for U.S. Appl. No. 29/661,984 (pp. 1-7).
Office Action (Non-Final Rejection) dated Feb. 26, 2024 for U.S. Appl. No. 17/824,646 (pp. 1-6).

(56) References Cited

OTHER PUBLICATIONS

Office Action dated Apr. 8, 2024 for U.S. Appl. No. 29/839,090 (pp. 1-6).
Office Action (Notice of Allowance and Fees Due (PTOL-85)) dated Jun. 21, 2024 for U.S. Appl. No. 17/824,646 (pp. 1-7).

* cited by examiner

GAMING MACHINES WITH MOVEABLE TOPPER AND METHOD OF OPERATING THE SAME

CROSS REFERENCE TO RELATED APPLICATIONS

This application is a continuation of and claims priority to U.S. patent application Ser. No. 17/824,646, filed May 25, 2022, which is a continuation of U.S. patent application Ser. No. 17/166,311, now U.S. Pat. No. 11,361,614, filed Feb. 3, 2021, which is a continuation of U.S. patent application Ser. No. 16/446,074, now U.S. Pat. No. 10,937,270, filed Jun. 19, 2019, which claims priority to U.S. Provisional Application No. 62/725,644, filed Aug. 31, 2018, each of which is hereby incorporated by reference herein in its entirety.

TECHNICAL FIELD

The field of disclosure relates generally to electronic gaming, and more particularly to an electronic gaming machine and method that allows a topper to be mobile between a raised and a lowered position.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance. When the player is done, he/she cashes out the credit balance (typically by pressing a cash out button to receive a ticket from the ticket printer 222). The ticket may be "cashed-in" for money or inserted into another machine to establish a credit balance for play by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Many conventional gaming machines are stationary and include no moving parts.

BRIEF DESCRIPTION

In one aspect, an electronic gaming machine is provided. The electronic gaming machine includes a display screen for displaying a wagering game. The electronic gaming machine also includes a player input device for playing the wagering game. The electronic gaming machine further includes a mobile topper unit configured to move to a plurality of positions. In addition, the electronic gaming machine provides a controller programmed to execute the wagering game and further programmed to change the position of the mobile topper unit between a first position and a second position based on the wagering game.

In another aspect, a method for controlling a mobile topper of an electronic gaming machine is provided. The method is executed by a controller of the electronic gaming machine. The method includes executing a wagering game on the electronic gaming machine. The method also includes detecting an event in the wagering game. The method further includes determining a position for the mobile topper based on the event. In addition, the method includes instructing the mobile topper to move to the position.

In a further aspect, a mobile topper connected to an electronic gaming machine is provided. The mobile topper includes an actuator assembly for moving the mobile topper to a plurality of positions in relation to the electronic gaming machine. When the mobile topper is in at least one of the plurality of positions, the mobile topper is visible to a player of the electronic gaming machine. The mobile topper also includes a controller programmed to determine a desired position of the plurality of positions for the mobile topper in relation to the electronic gaming machine. The controller is also programmed to instruct the actuator assembly to move the mobile topper to the desired position in relation to the electronic gaming machine.

BRIEF DESCRIPTION OF THE DRAWINGS

An example embodiment of the subject matter disclosed will now be described with reference to the accompanying drawings.

DETAILED DESCRIPTION

An electronic gaming machine includes a mobile topper. The mobile topper may include lights and a display screen. The mobile topper moves between a raised and a lowered position. In the lowered position, most or all of the display screen and the mobile topper may be hidden behind the electronic gaming machine. The mobile topper raises and lowers based on the gameplay of the electronic gaming machine. For example, the mobile topper may display a jackpot wheel, where the mobile topper raises to be visible when the player activates a bonus feature. In some embodiments, the mobile topper only stops at two positions, raised and lowered. In other embodiments, the mobile topper stops at a plurality of positions between the fully raised and fully lowered positions.

Figure 1:
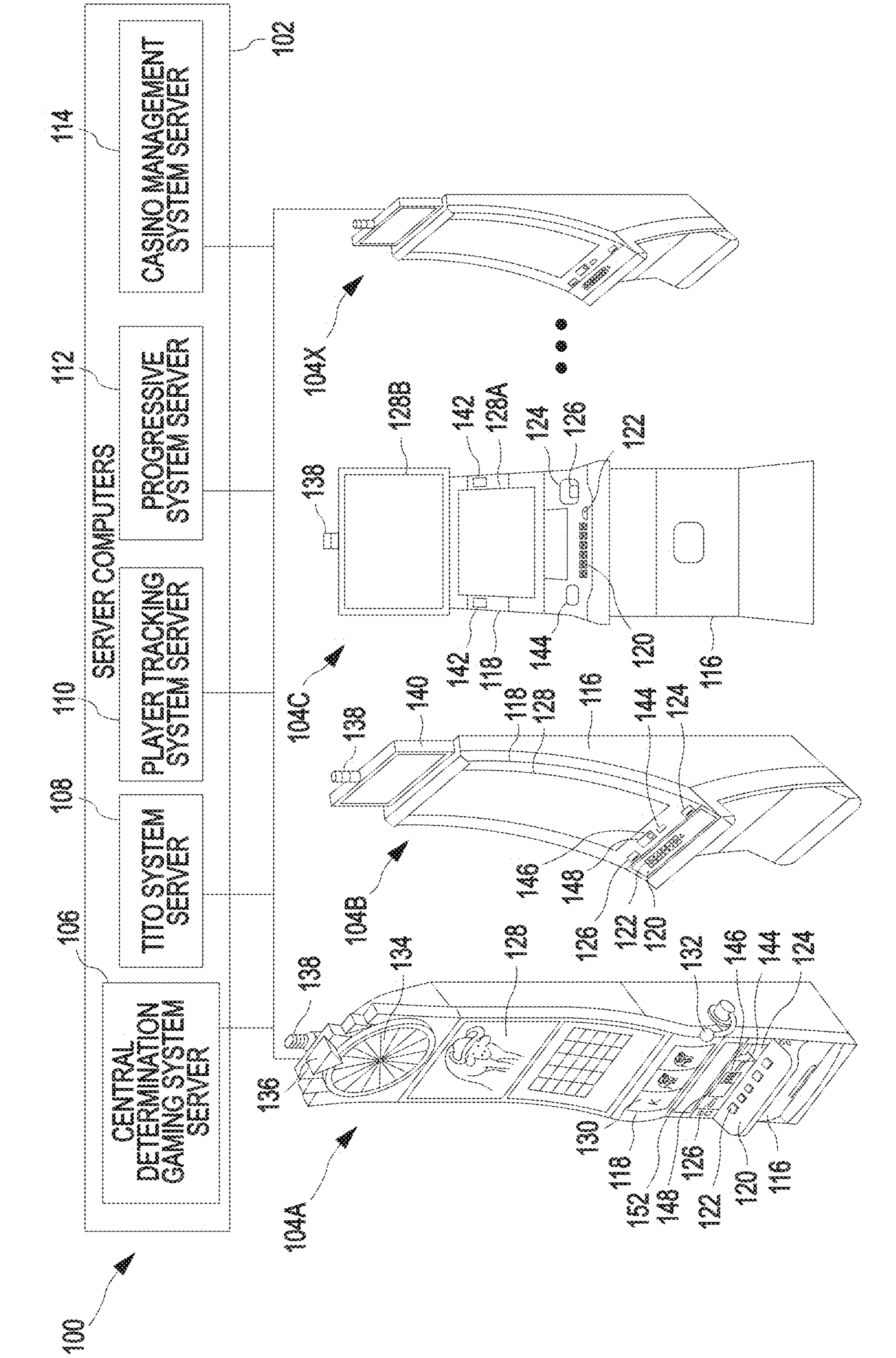
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XLTM model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game. In the exemplary embodiment, bonus topper wheel 134 is mobile and moves during game play.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
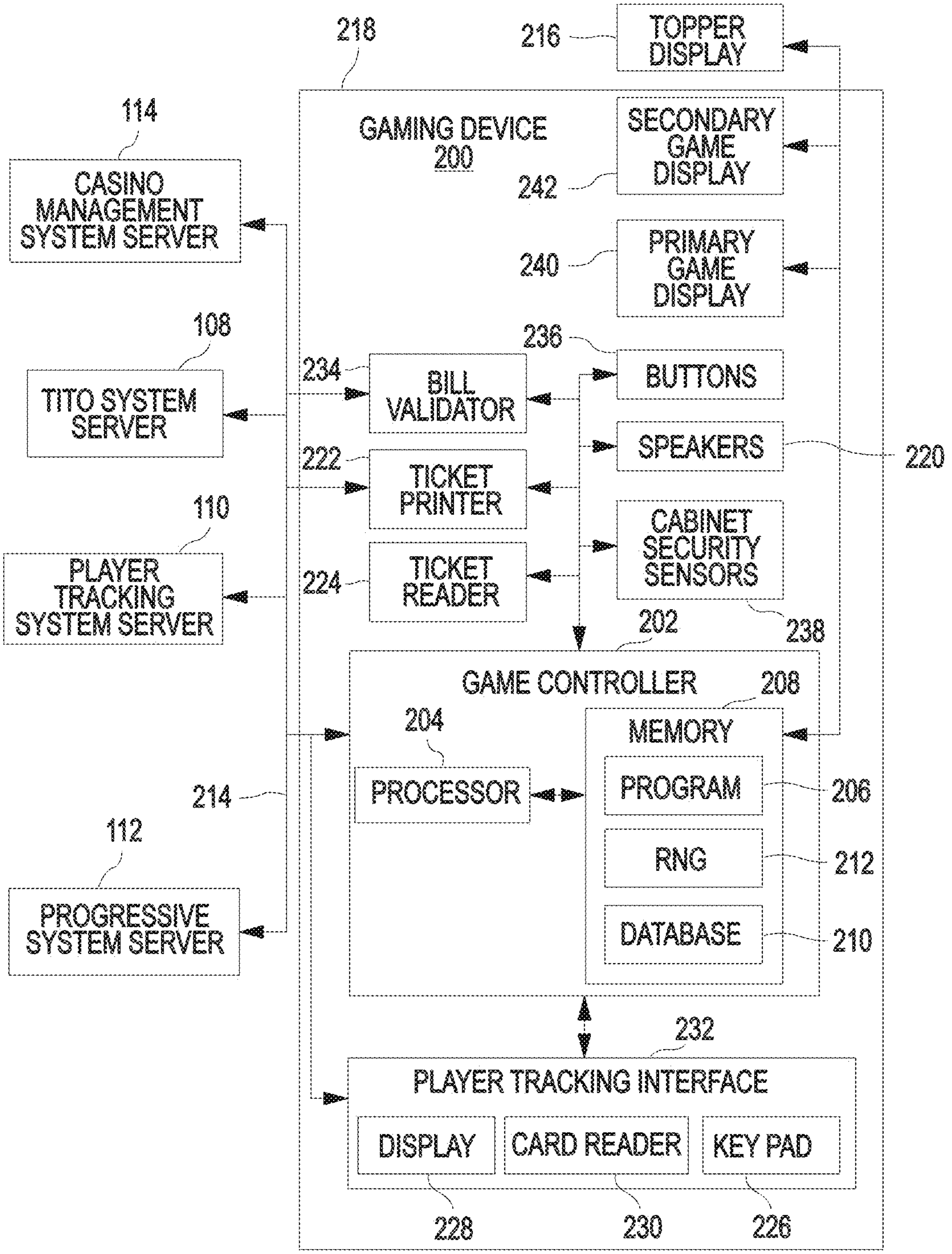
FIG. 2 is a block diagram showing various functional elements of an exemplary EGM as shown in FIG. 1.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they provide a mobile topper that changes position in response to game play. These embodiments are thus not merely new game rules or simply a new display pattern.

The gaming device 200 may include a topper display 216 or another form of a top box (e.g., a topper wheel, a topper screen, etc.) which moves from behind the cabinet 218 to above the cabinet 218 and visa versa, during game play. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
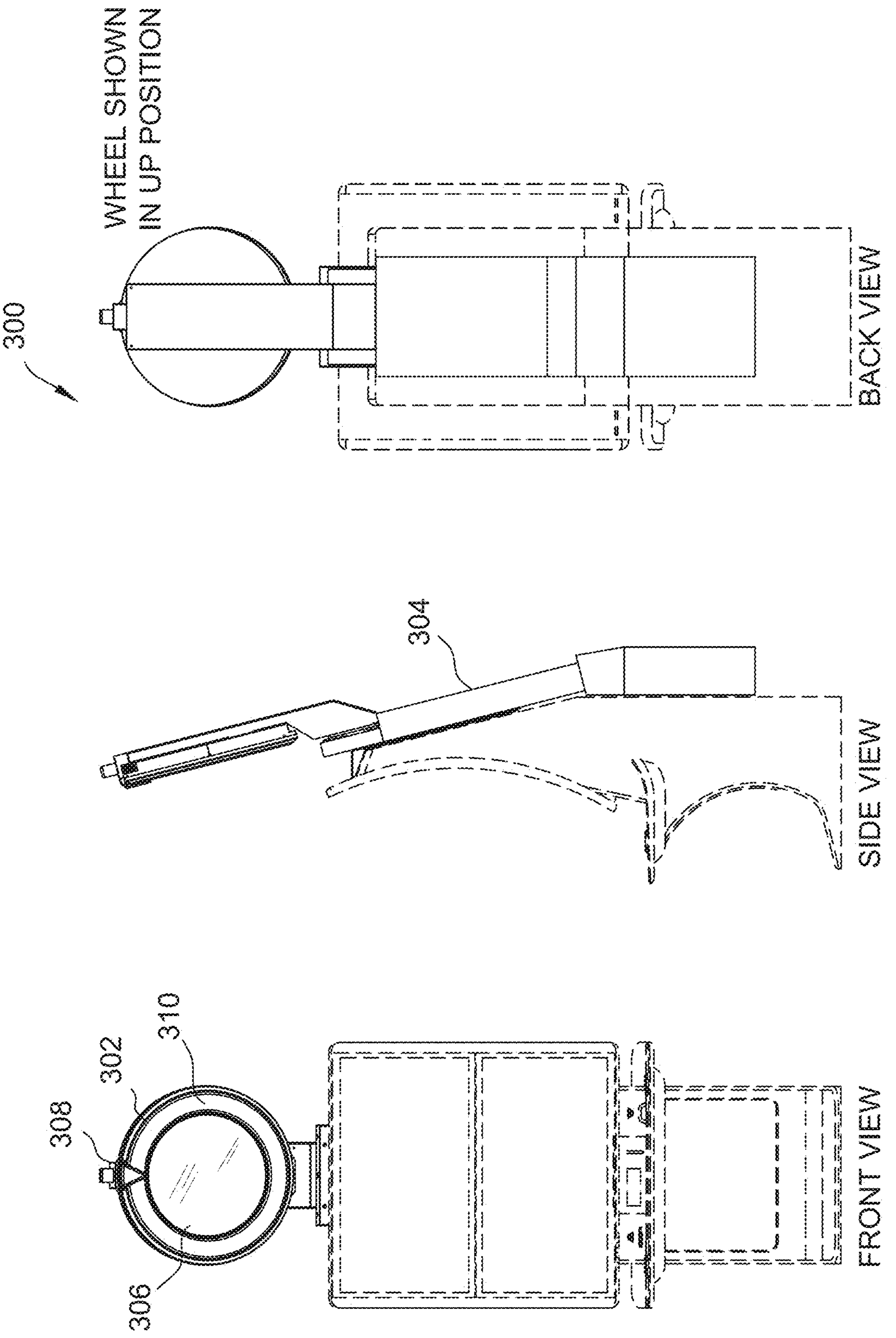
FIG. 3 is an exemplary diagram showing a plurality of views of an EGM with a mobile topper in a raised position.
Figure 4:
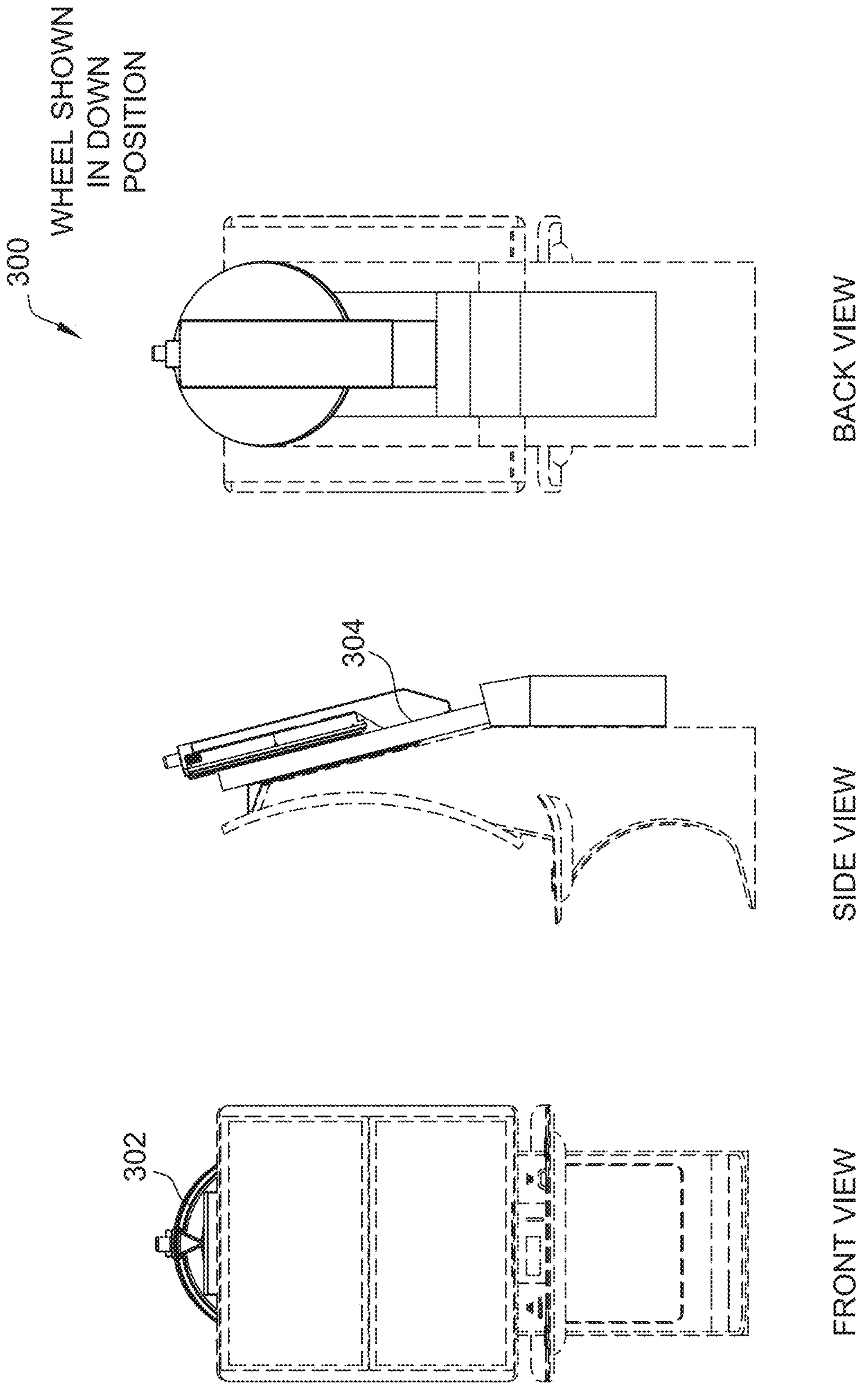
FIG. 4 is an exemplary diagram showing a plurality of views of an EGM with a mobile topper in a lowered position.

FIG. 3 is an exemplary diagram showing a plurality of views of an EGM 300 with a mobile topper 302 in a fully raised position. FIG. 4 is an exemplary diagram showing a plurality of views of EGM 300 with the mobile topper 302 in a fully lowered position.

In the exemplary embodiment, EGM 300 is similar to gaming devices 104A-104X (shown in FIG. 1). In these embodiments, EGM 300 includes a mobile topper 302 that is situated on an actuator assembly 304. In some embodiments, mobile topper 302 is similar to bonus topper wheel 134 (shown in FIG. 1) or topper display 216 (shown in FIG. 2).

Actuator assembly 304 includes a locomotion system that allows actuator assembly 304 to move mobile topper 302 between an up position as shown in FIG. 3 and a down position as shown in FIG. 4. Examples of locomotion systems include, but are not limited to positioning screws, hydraulic lifts, pneumatic lifts, cog wheels, and/or one or more belt drives.

In some embodiments, the actuator assembly 304 transitions the mobile topper 302 between the up and down positions. In other embodiments, the actuator assembly 304 is capable of transitioning the mobile topper 302 to a plurality of partially raised positions between the up and down positions.

In the exemplary embodiment, the mobile topper 302 is shaped like a bonus wheel. In some embodiments, the mobile topper 302 includes a display screen 306. In some further embodiments, the mobile topper 302 also includes a pointer 308 and one or more lighting systems 310 around the display screen 306. The display screen 306 may include, but is not limited to, a high-resolution LCD, plasma, LED, or OLED panel. While the mobile topper 302 is round in the figures, one skilled in the art would understand that the mobile topper 302 could be any shape to fit the theme of the EGM 300.

In the exemplary embodiment, the game controller 202 (shown in FIG. 2) controls the position of the mobile topper 302. In this embodiment, the game controller 202 transmits instructions to the actuator assembly 304 as to where the mobile topper 302 should be positioned. In some embodiments, the mobile topper 302 is positioned based on the wagering game being conducted on the EGM 300. For example, the mobile topper 302 may be kept in the down position during game play and is raised only during a bonus feature that requires a jackpot wheel.

In another example, the mobile topper 302 is partially raised from the down position while a player is building up to a bonus feature. This may increase player excitement. In one example, a game requires six locking symbols to activate a bonus wheel. For each locking symbol that appears, the actuator assembly 304 moves the mobile topper 302 upwards closer to the full up position. When all six locking symbols have appeared, the mobile topper 302 is fully extended into the up position and the bonus wheel is used as a part of the game. This partial movement may also be an integral part of game play of the wagering game and may represent time or other partial or full completion of in game goals. An example would be where the mobile topper 302 represents the sun, the moon, or seasons and may display a view of the sun, the moon, or seasons as it raises or lowers. As the player continues to play, the movement of the mobile topper 302 may also indicate that an additional feature or change in the game will be occurring when the mobile topper 302 finishes the transition between the up and the down position. In other embodiments, the mobile topper 302 may be used in an attract mode to have the movement of the mobile topper 302 enhance the attract mode's ability to garner attention.

In the embodiment shown in FIG. 4, when retracted a portion of the mobile topper 302 is visible over the top of the cabinet. In other embodiments, the mobile topper 302 is retracted so that it is not visible to the user while playing the game.

While the mobile topper 302 and the actuator assembly 304 are shown angled towards the front of the EMG 300, in other embodiments, the mobile topper 302 may be move vertically or at any angle that allows it to function as described herein.

In the exemplary embodiment, the mobile topper 302 physically moves from a first position to a second position in such a way as to translocate between the positions. As shown in the Figures, the entire mobile topper 302 moves vertically in relation to the attached EGM 300 while maintaining the same orientation towards the EGM 300. In some embodiments, the mobile topper 302 rotates in relation to the EGM 300 in addition to changing positions, vertically, horizontally, or a combination thereof.

Figure 5:
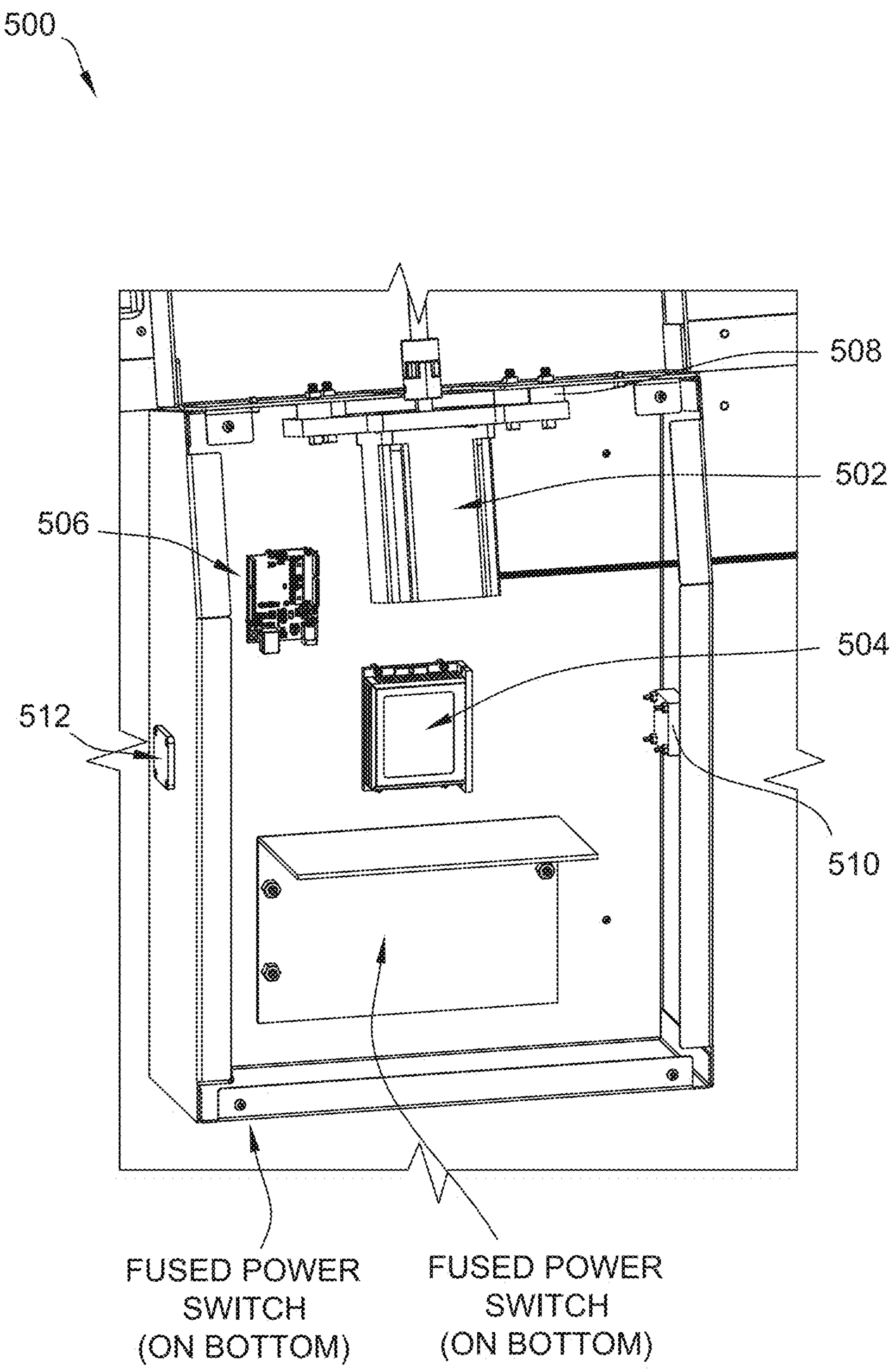
FIG. 5 is an exemplary diagram showing a lower electronics box of an EGM with a mobile topper.

FIG. 5 is an exemplary diagram showing a lower electronics box 500 of the actuator assembly 304 of an EGM 300 with a mobile topper 302 (all shown in FIG. 3). In the exemplary embodiment, the lower electronics box 500 includes a motor 502 for moving the mobile topper 302. In the exemplary embodiment, the motor 502 is a stepper motor. In other embodiments, the motor 502 may be any type of motor that allows the mobile topper 302 to move as described herein. While only one motor 502 is shown, multiple motors 502 may be used to actuate the mobile topper 302 to the desired position.

In the exemplary embodiment, the motor 502 is in communication with a motor controller 504, which controls the movement of the motor 502. The motor controller 504 is in communication with a logic controller 506, which is in communication with the game controller 202 (shown in FIG. 2). In some embodiments, the game controller 202 instructs the logic controller 506 where the mobile topper 302 should be positioned. The logic controller 506 then determines where the mobile topper 302 is currently positioned. Based on the current position of the mobile topper 302, the logic controller 506 instructs the motor controller 504 how much to have the motor 502 move the mobile topper 302. In some embodiments, the motor controller 504 controls the motor 502 to move for a determined period of time. In other embodiments, the motor 502 is a stepper motor and the motor controller 504 instructs the motor 502 to move a specific number of steps.

In the exemplary embodiment, the motor 502 is attached to the lower electronics box 500 with several vibrational dampeners 508. These vibrational dampeners are configured to reduce the vibration transmitted to the EGM 300 when the mobile topper 302 moves. While only four vibrational dampeners 508 are shown in the current figure, additional vibrational dampeners 508 may be used at additional points in the actuator assembly to prevent vibrations from being transmitted to the EGM 300.

In some embodiments, the lower electronics box 500 also includes at least one fan 510 and at least one vent 512 to stimulate airflow and reduce heat in the lower electronics box 500. The lower electronics box 500 may also include one or more power supplies to power the motor 502 and/or the display of the mobile topper 302. The lower electronics box 500 may also include a fused power switch (not shown) to protect the components of the lower electronics box 500 and the actuator assembly 304.

Figure 6:
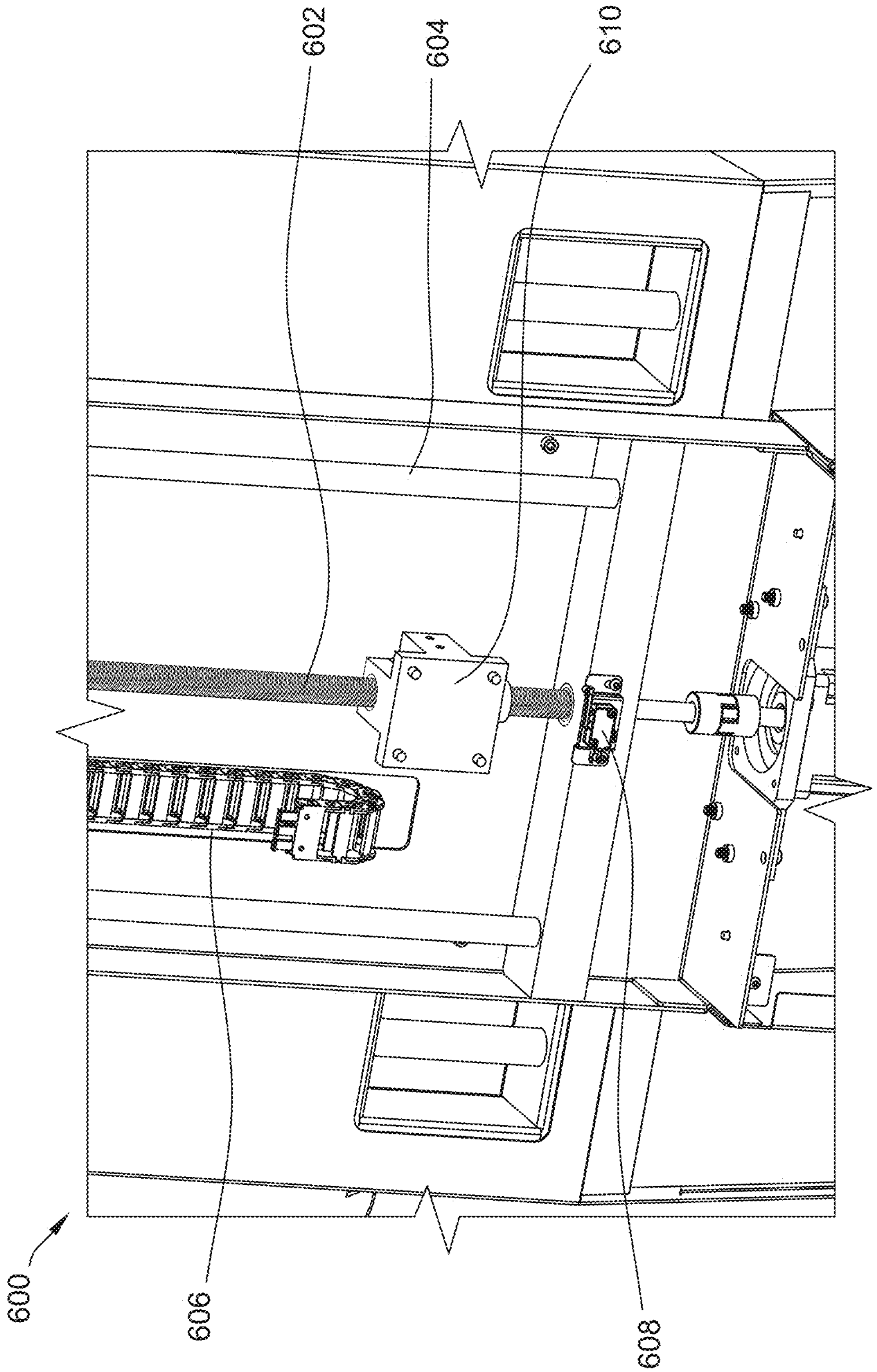
FIG. 6 is an exemplary diagram of a view of an exemplary movement system for use with a mobile topper.

FIG. 6 is an exemplary diagram of a view of an exemplary actuation system 600 of actuator assembly 304 for use with the mobile topper 302 (both shown in FIG. 3). In this embodiment, the actuation system 500 uses a lead screw 602 (shown in FIG. 6) and at least two slide rails 604 to actuate the mobile topper 302 between the up position and the down position. In other embodiments, the actuation system 600 (shown in FIG. 6) may use hydraulic lifts, pneumatic lifts, cog wheels, or one or more belt drives to move the mobile topper 302. In this embodiment, the motor 502 (shown in FIG. 5) rotates the lead screw 602 to raise and lower the mobile topper 302. The linear slide rails 604 prevent the mobile topper 302 from rotating and facilitate the smooth movement of the mobile topper 302.

A flexible cable management system 606 protects power and communication cables that connect between the EGM 300 and the mobile topper 302. A lower (home) switch 608 is a sensor that is configured to tell the position of the mobile topper 302. For example, during a power-up sequence the lower (home) switch 608 may report that the mobile topper 302 is in the down position due to being in contact with a portion of the mobile topper 302. In other embodiments, the lower (home) switch 608 is capable of determining the current position of the mobile topper 302 in the actuator assembly 304, such as with a visual or laser sensor or an optical encoder.

In the embodiment shown in FIG. 6, a mobile bracing unit 10 is attached to the lead screw 602 and is a part of the actuator assembly 304 for the mobile topper 302. The mobile bracing unit 610 includes interior grooves that allow it to move vertically when the lead screw 602 is rotated. This then causes the attached mobile topper 302 to move.

Figure 7:
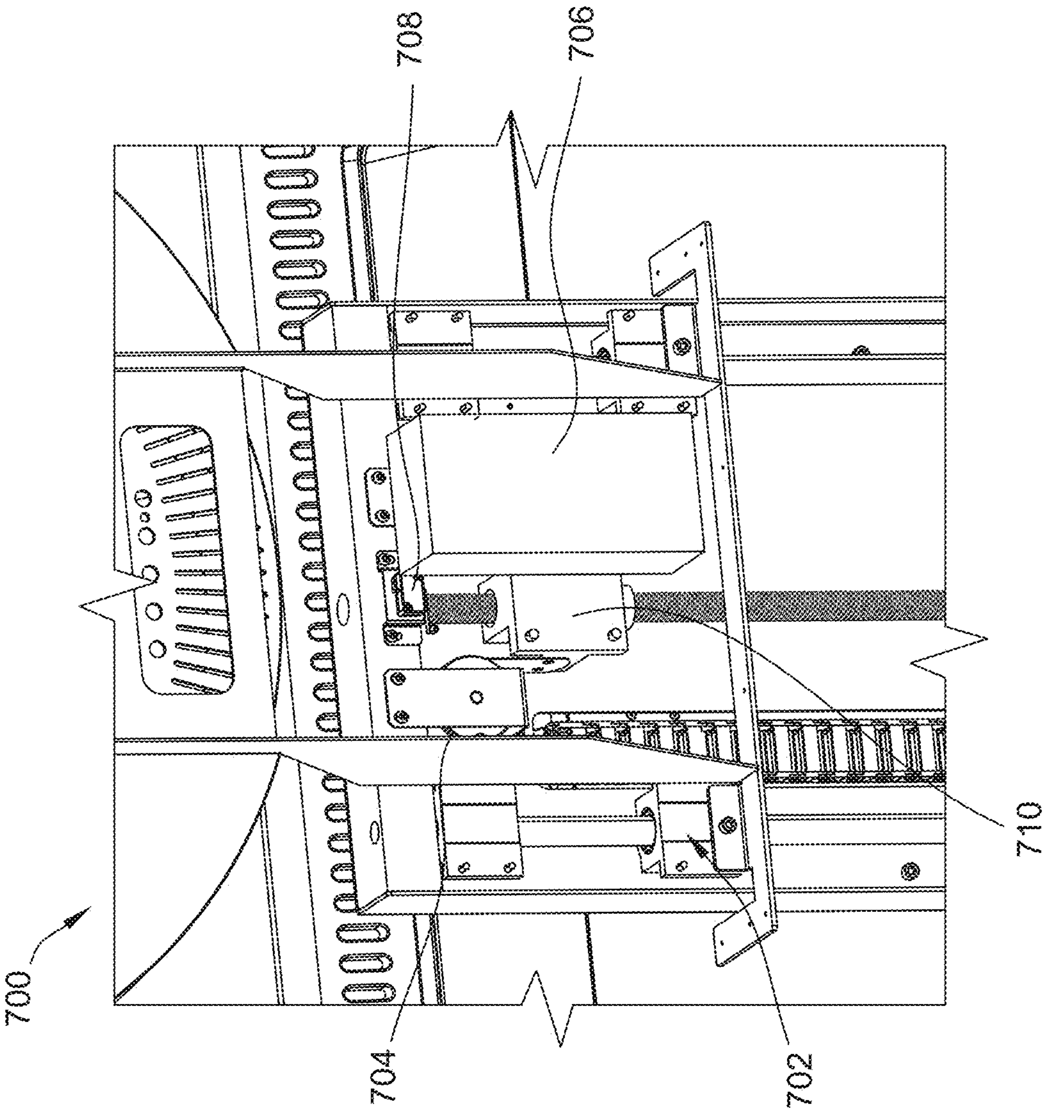
FIG. 7 is an exemplary diagram of another view of the exemplary movement system for use with a mobile topper.

FIG. 7 is an exemplary diagram of a view of an exemplary topper actuation system 700 of actuator assembly 304 for use with the mobile topper 302 (shown in FIG. 3). In the exemplary embodiment, the topper actuation system 700 is attached to the mobile topper 302 and interacts with the actuation system 600 to facilitate moving the mobile topper 302. In this embodiment, the topper actuation system 700 includes linear slide bearings 702 which interact with the linear slide rails 604 to guild the mobile topper 302. The topper actuation system 700 may also include one or more counterbalances 704 to act as tensioners to ensure the stability and smooth movement of the mobile topper 302. In the exemplary embodiment, mobile bracing unit 710 is similar to mobile bracing unit 610 (shown in FIG. 6).

A LCD power supply 706 may control and regulate the power to the display of the mobile topper 302. An upper limit switch 708 is a sensor that is configured to tell the position of the mobile topper 302. In some embodiments, the upper limit switch 708 is attached to the actuation system 600. In other embodiments, the upper limit switch 708 is attached to the topper actuation system 700. For example, during a power-up sequence the upper limit switch 708 may report that the mobile topper 302 is in the up position due to being in contact with a portion of the mobile topper 302. In other embodiments, the upper limit switch 708 is capable of determining the current position of the mobile topper 302 in the actuator assembly 304, such as with a visual or laser sensor or an optical encoder.

Figure 8:
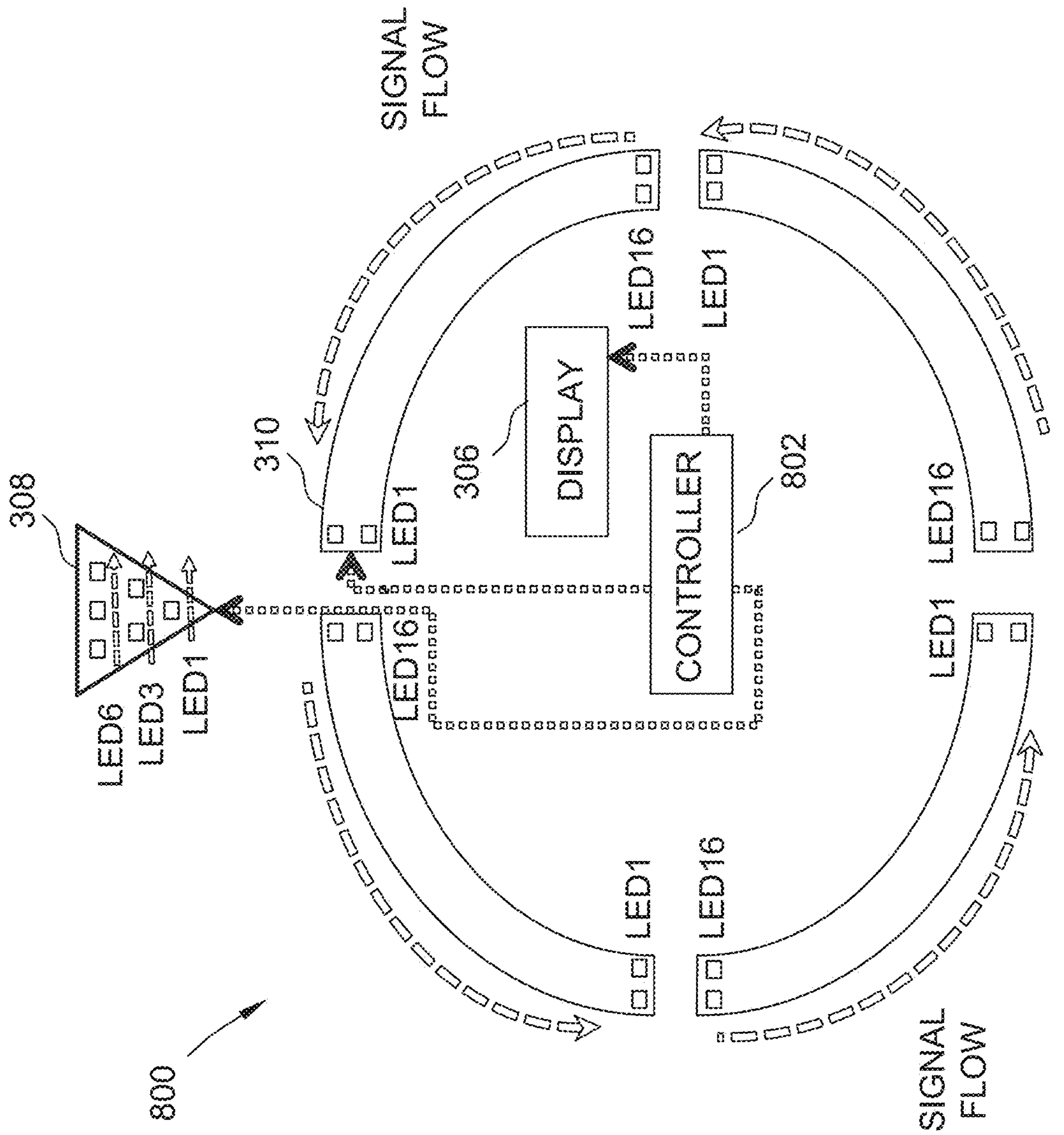
FIG. 8 is an exemplary diagram of a plurality of views of the topper for the mobile topper system as disclosed herein.

FIG. 8 is an exemplary diagram 800 of the display area of the mobile topper 302 as disclosed herein. In the exemplary embodiment, the mobile topper 302 display area includes at least a display screen 306, such as, but not limited to, a high-resolution LCD, plasma, an LED, or an OLED panel. In the exemplary embodiment, the display screen 306 is positioned parallel to the ground. In some embodiments, the mobile topper 302 includes a pointer 308. For example the pointer 308 may be used to indicate a position on a wheel that is displayed on the mobile topper display screen 306. The pointer 308 may be any shape based on the theme of the wagering game being played. The pointer 308 may include lights. In addition, the mobile topper 302 may include a border 310 around the display, such as a ring. In some embodiments, the border 310 may include lights to enhance the display of the mobile topper 302. As shown in the exemplary design in FIG. 8, there may be three rows of LEDs in the pointers and two rows of LEDs in the border 310. Other configurations may be envisioned based on the theme or the wagering game or the EMG 300 that the mobile topper 302 is attached to.

In the exemplary embodiment, the display screen 306, the pointer 308, and the border 310 are all in communication with and controlled by a controller 802. In some embodiments, the controller 802 is the game controller 202 (shown in FIG. 2). In other embodiments, the controller 802 is a separate controller that may be associated with the mobile topper assembly 304 (shown in FIG. 3) or solely associated with the mobile topper 302, itself. In some embodiments, the border 310 is wired to have the signals flow from the controller 802 in a counter clockwise direction. Other configurations may be used in other embodiments.

Figure 9:
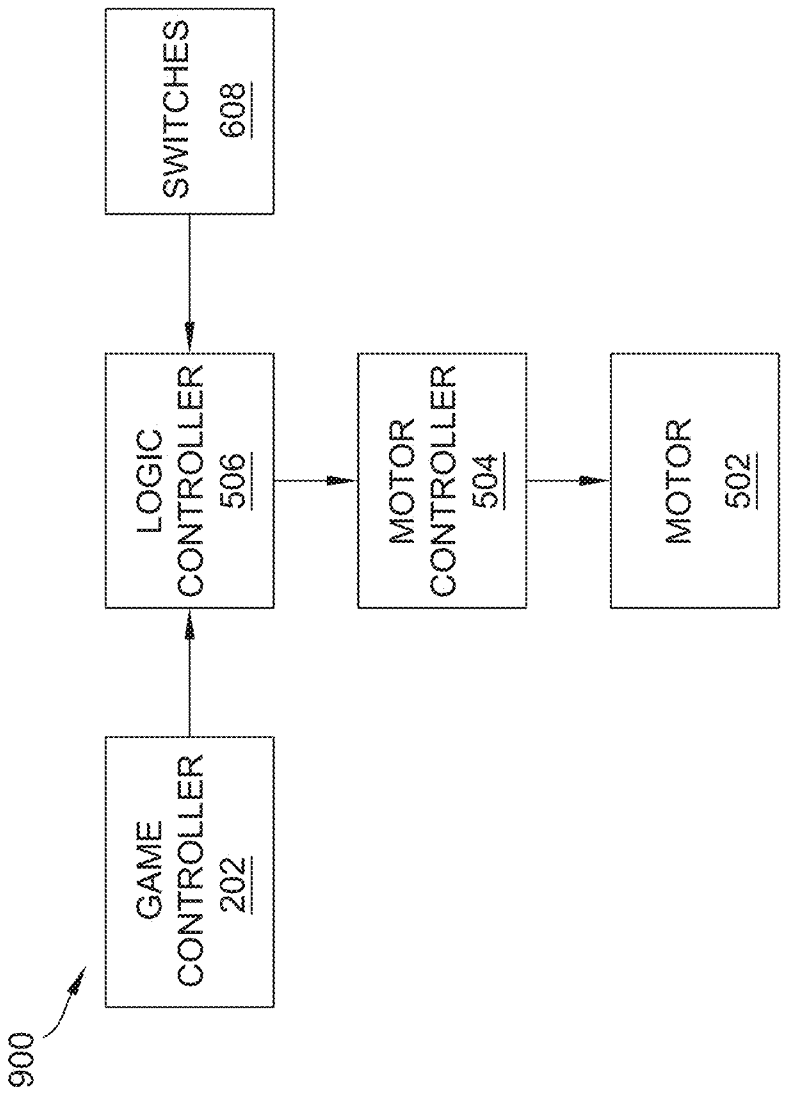
FIG. 9 is another exemplary diagram of the topper for the mobile topper system as disclosed herein.

FIG. 9 is an exemplary diagram 900 of the data flow for the controllers of the electronic gaming machine with the mobile topper shown in FIG. 3. In this embodiment, the game controller 202 is associated with and located in the electronic gaming machine. The game controller 202 is in communication with the mobile topper assembly 304 (shown in FIG. 3). In the exemplary embodiment, the mobile topper assembly 304 contains the logic controller 506, the motor controller 504, the motor 502, and one or more switches. The logic controller 506 receives instructions from the game controller 202 about where the mobile topper 302 should be positioned. In some embodiments, the switches 608 provide location information about the mobile topper 302. The logic controller 506 determines the current position of the mobile topper 302 and compares that to the desired position received from the game controller 202. The logic controller 506 determines the difference between the current position and the desired position. In some embodiments, the logic controller 506 transmits the different in positions to the motor controller 504. In these embodiments, the motor controller 504 determines how much to move the mobile topper 302 and controls the motor 502 accordingly. In other embodiments, the logic controller 506 directly controls the motor 502. For example, if the motor 502 is a stepper motor and the motor controller 504 or the logic controller 506 instructs the motor 502 to move a specific number of steps to move the mobile topper 302 to the desired position.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

a display device configured to be moved between a first position and a second position; and a motor system for causing the display device to move between the first position and the second position, the motor system comprising:

a motor; and a motor controller, wherein the motor controller is configured to control the motor to cause the display device to move between the first position and the second position based upon receipt of a message from a game controller, the message associated with a trigger event based upon play of an electronic game at the electronic gaming device.

2. The electronic gaming device of claim 1, wherein the motor comprises at least one of positioning screws, hydraulic lifts, pneumatic lifts, cog wheels, or one or more belt drives.

3. The electronic gaming device of claim 1, further comprising the game controller.

4. The electronic gaming device of claim 3, wherein the game controller is configured to identify the trigger event in the electronic game.

5. The electronic gaming device of claim 4, wherein the game controller is configured to transmit the message associated with the trigger event to the motor controller.

6. The electronic gaming device of claim 4, wherein the trigger event is initiation of a bonus feature.

7. The electronic gaming device of claim 1, wherein the motor controller is further configured to determine a destination position for the display device, the destination position being between the first position and the second position.

8. The electronic gaming device of claim 7, wherein the motor controller is further configured to determine a distance to move the display device from a current position of the display device to the destination position.

9. The electronic gaming device of claim 8, wherein the motor controller is further configured to control the motor to cause the display device to move between the first position and the second position by controlling the motor to cause the display device to move the distance.

10. The electronic gaming device of claim 1, wherein the display device comprises a mobile topper device.

11. A motor system associated with an electronic gaming device, the motor system comprising:

a motor; and a motor controller, wherein the motor controller is configured to control the motor to cause a display device associated with the electronic gaming device to move between a first position and a second position based upon receipt of a message from a game controller, the message associated with a trigger event based upon play of an electronic game at the electronic gaming device.

12. The motor system of claim 11, wherein the motor comprises at least one of positioning screws, hydraulic lifts, pneumatic lifts, cog wheels, or one or more belt drives.

13. The motor system of claim 11, wherein the motor controller is in communication with the game controller.

14. The motor system of claim 13, wherein the game controller is configured to identify the trigger event in the electronic game.

15. The motor system of claim 14, wherein the motor controller is further configured to:

receive the message associated with the trigger event from the motor game controller.

16. The motor system of claim 14, wherein the trigger event is initiation of a bonus feature.

17. The motor system of claim 11, wherein the display device comprises a mobile topper device.

18. A method of controlling a display device in electronic gaming implemented by a motor system comprising a motor and a motor controller, the method comprising:

identifying, by the motor controller, a trigger event in an electronic game at an electronic gaming device associated with the display device based upon receipt of a message associated with the trigger event from a game controller; and causing, by the motor controller, the motor to cause the display device to move between a first position and a second position based upon the trigger event.

19. The method of claim 18, further comprising:

receiving, by the motor controller, the message from at least one processor of the game controller.

20. The method of claim 18, wherein the display device comprises a mobile topper device.

* * * * *